(12) United States Patent
Sun et al.

(10) Patent No.: US 11,073,455 B2
(45) Date of Patent: Jul. 27, 2021

(54) TRANSVERSE LOAD STEPLESS AMPLITUDE MODULATION DEVICE OF MULTIPLE BOLT LOOSING TESTER

(71) Applicant: DALIAN UNIVERSITY OF TECHNOLOGY, Dalian (CN)

(72) Inventors: Qingchao Sun, Dalian (CN); Qingyuan Lin, Dalian (CN); Bao Zhang, Dalian (CN); Xiaokai Mu, Dalian (CN); Bin Yang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 178 days.

(21) Appl. No.: 16/603,728

(22) PCT Filed: Jul. 17, 2018

(86) PCT No.: PCT/CN2018/095874
§ 371 (c)(1),
(2) Date: Oct. 8, 2019

(87) PCT Pub. No.: WO2020/014851
PCT Pub. Date: Jan. 23, 2020

(65) Prior Publication Data
US 2020/0264085 A1   Aug. 20, 2020

(51) Int. Cl.
*G01N 3/36* (2006.01)
*G01M 7/02* (2006.01)
(Continued)

(52) U.S. Cl.
CPC ............... *G01N 3/36* (2013.01); *G01M 7/02* (2013.01); *G01M 7/08* (2013.01); *G01M 13/00* (2013.01)

(58) Field of Classification Search
CPC .......... G01M 7/02; G01M 7/08; G01M 13/00; G01N 3/36; G01L 5/00; G01L 5/0033; G01L 5/0038; G01L 5/24; G01L 5/42
See application file for complete search history.

(56) References Cited

U.S. PATENT DOCUMENTS 5,222,849 A * 6/1993 Walton .................... G01L 5/24
411/14
5,339,696 A * 8/1994 Carignan .............. G01L 1/2206
73/761

(Continued)

FOREIGN PATENT DOCUMENTS

CN         204881945 U       12/2015
CN         106441760 A       2/2017
(Continued)

*Primary Examiner* — Natalie Huls
(74) *Attorney, Agent, or Firm* — Muncy, Geissler, Olds & Lowe, P.C.

(57) ABSTRACT

The present invention belongs to the technical field of mechanical testing devices, and provides a transverse load stepless amplitude modulation device of multiple bolt loosing tester. The transverse load stepless amplitude modulation device of multiple bolt loosing tester consists of four parts: a transverse load stepless amplitude modulation part, a transverse load transmission part, a torque load transmission part and an axial load transmission part. The transverse load stepless amplitude modulation device of multiple bolt loosing tester of the present invention provides stepless amplitude modulation continuous transverse loads for a flange bolt set and guarantees the accuracy of the transverse loads through a feedback control system.

1 Claim, 1 Drawing Sheet

(51) Int. Cl.
*G01M 7/08* (2006.01)
*G01M 13/00* (2019.01)

(56) References Cited

U.S. PATENT DOCUMENTS

| | | | | |
|---|---|---|---|---|
| 5,584,627 | A * | 12/1996 | Ceney | F16B 31/025 |
| | | | | 411/14 |
| 5,597,964 | A * | 1/1997 | Binns | G01L 5/0042 |
| | | | | 73/761 |
| 6,892,585 | B2 * | 5/2005 | Clarke | F16B 31/025 |
| | | | | 411/14 |
| 8,024,979 | B2 * | 9/2011 | Clarke | F16B 31/025 |
| | | | | 73/761 |
| 9,557,235 | B2 * | 1/2017 | Kaindl | G01L 5/24 |
| 9,702,797 | B2 * | 7/2017 | Yang | B25H 1/005 |
| 10,598,567 | B1 * | 3/2020 | Sun | G01M 13/02 |
| 10,620,069 | B2 * | 4/2020 | Sun | G01L 5/24 |
| 10,746,642 | B2 * | 8/2020 | Sun | G05B 19/0405 |
| 2010/0162829 | A1 * | 7/2010 | Chiapuzzi | G01L 5/24 |
| | | | | 73/862.21 |
| 2017/0082510 | A1 * | 3/2017 | Futai | G01L 5/0071 |
| 2019/0242779 | A1 * | 8/2019 | Sun | G01M 5/005 |
| 2019/0257706 | A1 * | 8/2019 | Sakakibara | G01L 5/0042 |
| 2020/0278240 | A1 * | 9/2020 | Sun | G01L 25/00 |
| 2020/0309624 | A1 * | 10/2020 | Sun | G01M 13/00 |
| 2021/0033393 | A1 * | 2/2021 | Liu | F16B 31/04 |

FOREIGN PATENT DOCUMENTS

| | | |
|---|---|---|
| CN | 207231690 U | 4/2018 |
| CN | 108036890 A | 5/2018 |
| CN | 207336214 U | 5/2018 |
| JP | 2011-021989 A | 2/2011 |

\* cited by examiner

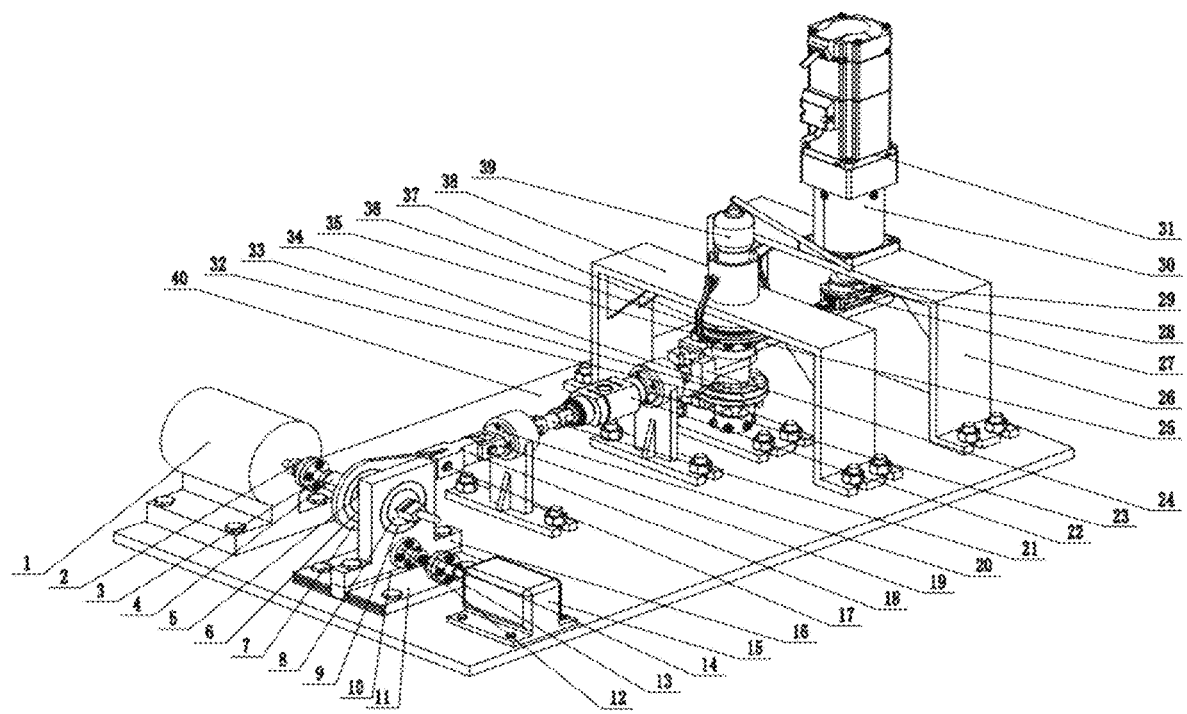

US 11,073,455 B2

TRANSVERSE LOAD STEPLESS AMPLITUDE MODULATION DEVICE OF MULTIPLE BOLT LOOSING TESTER

TECHNICAL FIELD

The present invention belongs to the technical field of mechanical testing devices, and relates to a transverse load stepless amplitude modulation device of multiple bolt loosing tester.

BACKGROUND

Bolt loosing is one of the main failure modes of bolted connection structures. A bolt loosing tester can be used to study the loosing of the bolt under different working conditions. The existing bolt loosing testers can be classified into single bolt loosing testers and multiple bolt loosing testers. The single bolt loosing tester mainly includes a Junker loosing tester, a NAS loosing tester and an electro-hydraulic servo vibration tester. The above three single bolt loosing testers cannot test the loosing of a bolt set, and the load that can be applied is relatively simple, and is difficult to simulate real working conditions. However, the current multiple bolt loosing testers provide a transverse load as a fixed load, or need to change the size of a part to obtain different loads, which is high in cost and long in cycle. Moreover, the provided load is difficult to be accurately controlled, and is difficult to accurately simulate the real working conditions of the bolt set.

Therefore, the transverse load stepless amplitude modulation device of multiple bolt loosing tester is designed to provide stepless amplitude modulation continuous transverse loads for a flange bolt set and accurately control the transverse load values by a feedback system, so as to more accurately simulate the loosing of a flange under working conditions. At present, there is no relevant patent in the multiple bolt loosing tester.

SUMMARY

The purpose of the present invention is to provide a transverse load stepless amplitude modulation device of multiple bolt loosing tester, which can apply stepless amplitude modulation continuous transverse loads to a multiple bolt connecting flange and guarantee the accuracy of the transverse loads through a feedback control system.

The technical solution of the present invention is:

A transverse load stepless amplitude modulation device of multiple bolt loosing tester consists of four parts: a transverse load stepless amplitude modulation part, a transverse load transmission part, a torque load transmission part and an axial load transmission part.

The torque load transmission part comprises a torque arm 25, a speed reducer support frame 26, a guide rail sliding block 27, a bearing outer sleeve 28, a torque eccentric coupling 29, a speed reducer 30 and a torque servo motor 31; the speed reducer support frame 26 is fixed to a bottom plate 40; the torque servo motor 31 is externally connected with the speed reducer 30; an output shaft of the speed reducer 30 penetrates through the speed reducer support frame 26 and is fixed to the speed reducer support frame 26; the output shaft of the speed reducer 30 is connected with the torque eccentric coupling 29; the torque eccentric coupling 29 is fixed together with the upper end surface of the bearing outer sleeve 28; the lower end surface of the bearing outer sleeve 28 is fixed to a sliding block of the guide rail sliding block 27; a guide rail of the guide rail sliding block 27 is fixed to the torque arm 25; and one end of the torque arm 25 provided with a hexagon socket head is sleeved above a tensile plate 24 on an outer hexagon of a thick plank 33.

The axial load transmission part comprises a thin plank 32, the thick plank 33, a specimen bolt 34, a bearing cap 35, a thrust ball bearing 36, an upper clamping plate 37, an axial load support frame 38 and a hydraulic rama 39; spigots of the thin plank 32 and the thick plank 33 are correspondingly assembled together; the upper end of the thick plank 33 and a right circular hole of the tensile plate 24 are assembled together, and the tail end of the thick plank 33 is installed in an inner ring of the upper clamping plate 37; the bearing cap 35 penetrates through the upper clamping plate 37, and clamps the thrust ball bearing 36 between the bearing cap 35 and the upper clamping plate 37; and one end of an oil hydraulic starting lever of the hydraulic rama 39 is placed in a cylinder on the axial load support frame 38, and a grappling hook on the oil hydraulic starting lever grapples the edge of the bearing cap 35.

The transverse load stepless amplitude modulation part comprises a second square shaft bushing 8, a square shaft bearing 9, a transverse load guide rail moving plate 10, a transverse load guide rail fixed base plate 11, a lead screw nut 12, a ballscrew 13, a servo motor coupling 14, a servo motor 15 and a T-shaped sliding block 16. The second square shaft bushing 8 is connected with the square shaft bearing 9; the square shaft bearing 9 is installed in the T-shaped sliding block 16 through interference fit; the T-shaped sliding block 16 is installed on the transverse load guide rail moving plate 10, and moves together with the transverse load guide rail moving plate 10; the transverse load guide rail moving plate 10 can slide on the transverse load guide rail fixed base plate 11, and the transverse load guide rail fixed base plate 11 is installed on the bottom plate 40; the T-shaped sliding block 16 is connected with the lead screw nut 12, and the lead screw nut 12 is matched with the ballscrew 13 and located below the square shaft bearing 9; and the ballscrew 13 is connected with the servo motor 15 through the servo motor coupling 14, and the servo motor 15 is fixed to the bottom plate 40.

The transverse load transmission part comprises a spindle motor 1, a spindle motor output shaft flange 2, a square shaft flange 3, a square shaft 4, a first square shaft bushing 5, a crankshaft bearing 6, an eccentric rocker 7, a rocker connecting pin 17, a rocker connecting block 18, a U-shaped connecting rod 19, a first straight bearing 20, an elastic rod 21, a force sensor 22, a second straight bearing 23, a tensile plate 24 and a bottom plate 40; the spindle motor 1 is fixed to the bottom plate 40; an output shaft of the spindle motor 1 is connected with the square shaft 4 through the spindle motor output shaft flange 2 and the square shaft flange 3; the square shaft 4 drives the crankshaft bearing 6 through the first square shaft bushing 5 to rotate; the crankshaft bearing 6 transmits the motion to the eccentric rocker 7, and the eccentric rocker 7 is connected with the rocker connecting block 18 through the rocker connecting pin 17; the U-shaped connecting rod 19 is fixed to the rocker connecting block 18, and penetrates through the first straight bearing 20 to connect with the elastic rod 21; the elastic rod 21 is connected with the force sensor 22; and a transverse load is transmitted to the tensile plate 24 through the second straight bearing 23.

The present invention has the beneficial effects: the transverse load stepless amplitude modulation device of multiple bolt loosing tester of the present invention provides stepless amplitude modulation continuous transverse loads for a flange bolt set and guarantees the accuracy of the transverse loads through a feedback control system.

DESCRIPTION OF DRAWINGS

The sole FIGURE is a trimetric drawing of a tester.
In the FIGURE: 1 spindle motor; 2 spindle motor output shaft flange; 3 square shaft flange; 4 square shaft;
5 first square shaft bushing; 6 crankshaft bearing; 7 eccentric rocker; 8 second square shaft bushing; 9 square shaft bearing;
10 transverse load guide rail moving plate; 11 transverse load guide rail fixed base plate; 12 lead screw nut; 13 ballscrew;
14 servo motor coupling; 15 servo motor; 16 T-shaped sliding block; 17 rocker connecting pin;
18 rocker connecting block; 19 U-shaped connecting rod; 20 first straight bearing; 21 elastic rod; 22 force sensor;
23 second straight bearing; 24 tensile plate; 25 torque arm; 26 speed reducer support frame; 27 guide rail sliding block;
28 bearing outer sleeve; 29 torque eccentric coupling; 30 speed reducer; 31 torque servo motor;
32 thin plank; 33 thick plank; 34 specimen bolt; 35 bearing cap; 36 thrust ball bearing;
37 upper clamping plate; 38 axial load support frame; 39 hydraulic rama; and 40 bottom plate.

DETAILED DESCRIPTION

Specific embodiment of the present invention is further described below in combination with accompanying drawings and the technical solution.
As shown in the sole FIGURE:
A stepless amplitude modulation multiple bolt loosing tester consists of four parts: a transverse load stepless amplitude modulation part, a transverse load transmission part, a torque load transmission part and an axial load transmission part.
The transverse load stepless amplitude modulation part comprises a second square shaft bushing 8, a square shaft bearing 9, a transverse load guide rail moving plate 10, a transverse load guide rail fixed base plate 11, a lead screw nut 12, a ballscrew 13, a servo motor coupling 14, a servo motor 15 and a T-shaped sliding block 16. The second square shaft bushing 8 is connected with the square shaft bearing 9; the square shaft bearing 9 is installed in the T-shaped sliding block 16 through interference fit; the T-shaped sliding block 16 is installed on the transverse load guide rail moving plate 10, and moves together with the transverse load guide rail moving plate 10; and the transverse movement of the T-shaped sliding block 16 causes the change of the eccentricity of the eccentric rocker 7. The transverse load guide rail moving plate 10 can slide on the transverse load guide rail fixed base plate 11, and the transverse load guide rail fixed base plate is installed on the bottom plate 40; the T-shaped sliding block 16 is connected with the lead screw nut 12, and the lead screw nut 12 is matched with the ballscrew 13; and the ballscrew 13 is connected with the servo motor 15 through the servo motor coupling 14, and the servo motor 15 is fixed to the bottom plate 40.
The transverse load transmission part comprises a spindle motor 1, a spindle motor output shaft flange 2, a square shaft flange 3, a square shaft 4, a first shaft bushing 5, a crankshaft bearing 6, an eccentric rocker 7, a rocker connecting pin 17, a rocker connecting block 18, a U-shaped connecting rod 19, a first straight bearing 20, an elastic rod 21, a force sensor 22, a second straight bearing 23, a tensile plate 24 and a bottom plate 40; the spindle motor 1 is fixed to the bottom plate 40; an output shaft of the spindle motor 1 is connected with the spindle motor output shaft flange 2, and the spindle motor output shaft flange 2 is connected with the square shaft flange 3 through a bolt; the square shaft flange is connected with the square shaft 4; the square shaft 4 drives the crankshaft bearing 6 through the first shaft bushing 5 to rotate; the crankshaft bearing 6 is connected with the eccentric rocker 7 through interference fit; the motion is transmitted to the eccentric rocker 7; the eccentric rocker 7 is connected with the rocker connecting block 18 through the rocker connecting pin 17; the U-shaped connecting rod 19 penetrates through the first straight bearing 20 to connect with the elastic rod 21; the elastic rod 21 is connected with the force sensor 22; and a transverse load is transmitted to the tensile plate 24 through the second straight bearing 23.
The torque load transmission part comprises a torque arm 25, a speed reducer support frame 26, a guide rail sliding block 27, a bearing outer sleeve 28, a torque eccentric coupling 29, a speed reducer 30 and a torque servo motor 31; the speed reducer support frame 26 is fixed to a bottom plate 40; the torque servo motor 31 and the externally connected speed reducer 30 are jointly fixed to the speed reducer support frame 26; The output shaft of the speed reducer 30 is connected with the torque eccentric coupling 29; the torque eccentric coupling 29 is fixed together with the upper end surface of the bearing outer sleeve 28; the lower end surface of the bearing outer sleeve 28 is fixed to a sliding block of the guide rail sliding block 27; a guide rail of the guide rail sliding block 27 is fixed to the torque arm 25; and one end of the torque arm 25 provided with a hexagon socket head is sleeved above a tensile plate 24 on an outer hexagon of a thick plank 33.
The axial load transmission part comprises a thin plank 32, the thick plank 33, a specimen bolt 34, a bearing cap 35, a thrust ball bearing 36, an upper clamping plate 37, an axial load support frame 38 and a hydraulic rama 39; spigots of the thin plank 32 and the thick plank 33 are correspondingly assembled together; The upper end of the thick plank 33 and the tensile plate 24 are assembled together through clearance fit, and the tail end of the thick plank 33 is installed in an inner ring of the upper clamping plate 37; the bearing cap 35 penetrates through the upper clamping plate 37, and clamps the thrust ball bearing 36 between the bearing cap 35 and the upper clamping plate 37; and one end of an oil hydraulic starting lever of the hydraulic rama 39 is placed in a cylinder on the axial load support frame 38, and a grappling hook on the oil hydraulic starting lever grapples the edge of the bearing cap 35.
A stepless amplitude modulation multiple bolt loosing tester comprises the following step:
(1) pressurizing the hydraulic rama 39 to extend the oil hydraulic starting lever of the hydraulic rama 39, driving the grappling hook of the hydraulic rama 39 to move upwards, and grappling the edge of the bearing cap 35 by the grappling hook, thereby generating an axial tensile force.
(2) Starting the spindle motor 1 and driving the square shaft 4 by the spindle motor 1 to rotate, wherein the motor can rotate to output periodical transverse loads due to the existence of the eccentricity of the eccentric rocker 7, and the motor will not be locked due to the existence of the elastic rod 21.
(3) Starting the servo motor 15, monitoring the transverse loads by the force sensor 22 in real time, processing monitoring signals through the control system, controlling the servo motor 15 based on a processing result, and driving the T-shaped sliding block 16 by the servo motor 15 via the ballscrew 13 to move to change the eccentricity of the eccentric rocker 7, thereby realizing stepless amplitude modulation and accurate control for the transverse loads.

(4) Starting the torque servo motor 31, and swinging the torque arm 25 due to the existence of the eccentricity of the torque eccentric coupling 29, thereby generating torque loads.

The invention claimed is:

1. A transverse load stepless amplitude modulation device of multiple bolt loosing tester, the transverse load stepless amplitude modulation device of multiple bolt loosing tester consists of four parts: a transverse load stepless amplitude modulation part, a transverse load transmission part, a torque load transmission part and an axial load transmission part;

the torque load transmission part comprises a torque arm, a speed reducer support frame, a guide rail sliding block, a bearing outer sleeve, a torque eccentric coupling, a speed reducer and a torque servo motor; the speed reducer support frame is fixed to a bottom plate; the torque servo motor is externally connected with the speed reducer; an output shaft of the speed reducer penetrates through the speed reducer support frame and is fixed to the speed reducer support frame; the output shaft of the speed reducer is connected with the torque eccentric coupling; the torque eccentric coupling is fixed together with the upper end surface of the bearing outer sleeve; the lower end surface of the bearing outer sleeve is fixed to a sliding block of the guide rail sliding block; a guide rail of the guide rail sliding block is fixed to the torque arm; one end of the torque arm provided with a hexagon socket head, which is located above a tensile plate, is sleeved on an outer hexagon of a thick plank;

the axial load transmission part comprises a thin plank, the thick plank, a specimen bolt, a bearing cap, a thrust ball bearing, an upper clamping plate, an axial load support frame and a hydraulic rama; spigots of the thin plank and the thick plank are correspondingly assembled together; the upper end of the thick plank and a right circular hole of the tensile plate are assembled together, and the tail end of the thick plank is installed in an inner ring of the upper clamping plate; the bearing cap penetrates through the upper clamping plate, and clamps the thrust ball bearing between the bearing cap and the upper clamping plate; one end of an oil hydraulic starting lever of the hydraulic rama is placed in a cylinder on the axial load support frame, and a grappling hook on the oil hydraulic starting lever grapples the edge of the bearing cap;

wherein the transverse load stepless amplitude modulation part comprises a second square shaft bushing, a square shaft bearing, a transverse load guide rail moving plate, a transverse load guide rail fixed base plate, a lead screw nut, a ballscrew, a servo motor coupling, a servo motor and a T-shaped sliding block the second square shaft bushing is connected with the square shaft bearing; the square shaft bearing is installed in the T-shaped sliding block through interference fit; the T-shaped sliding block is installed on the transverse load guide rail moving plate, and moves together with the transverse load guide rail moving plate; the transverse load guide rail moving plate can slide on the transverse load guide rail fixed base plate, and the transverse load guide rail fixed base plate is installed on the bottom plate; the T-shaped sliding block is connected with the lead screw nut, and the lead screw nut is matched with the ballscrew and located below the square shaft bearing; the ballscrew is connected with the servo motor through the servo motor coupling, and the servo motor is fixed to the bottom plate;

the transverse load transmission part comprises a spindle motor, a spindle motor output shaft flange, a square shaft flange, a square shaft, a first square shaft bushing, a crankshaft bearing, an eccentric rocker, a rocker connecting pin, a rocker connecting block, a U-shaped connecting rod, a first straight bearing, an elastic rod, a force sensor, a second straight bearing, a tensile plate and a bottom plate; the spindle motor is fixed to the bottom plate; an output shaft of the spindle motor is connected with the square shaft through the spindle motor output shaft flange and the square shaft flange; the square shaft drives the crankshaft bearing through the first square shaft bushing to rotate; the crankshaft bearing transmits the motion to the eccentric rocker, and the eccentric rocker is connected with the rocker connecting block through the rocker connecting pin; the U-shaped connecting rod is fixed to the rocker connecting block, and penetrates through the first straight bearing to connect with the elastic rod; the elastic rod is connected with the force sensor; and a horizontal load is transmitted to the tensile plate through the second straight bearing.

* * * * *